United States Patent [19]

Howlett et al.

[11] Patent Number: 4,528,650
[45] Date of Patent: Jul. 9, 1985

[54] STREAMER CABLE MULTIPLEXING APPARATUS

[75] Inventors: Donald L. Howlett, Kingwood; Herbert J. Meyer, Bellaire; Stanley F. Zimmer, Houston, all of Tex.

[73] Assignee: Texaco Inc., White Plains, N.Y.

[21] Appl. No.: 385,741

[22] Filed: Jun. 7, 1982

[51] Int. Cl.³ .............................................. G01V 1/22
[52] U.S. Cl. .................................. 367/79; 340/870.13
[58] Field of Search ..................... 367/22, 55, 58, 76, 367/78, 79, 106, 134, 22 T; 370/77, 85; 340/870.13, 851, 852, 870.39, 858, 851 T

[56] References Cited

U.S. PATENT DOCUMENTS

| 2,605,360 | 7/1952 | Trevor | 340/870.13 X |
| 3,103,644 | 9/1963 | Burton | 340/870.13 X |
| 3,189,870 | 6/1965 | Roever | 367/22 X |
| 3,444,510 | 5/1969 | Tyndale et al. | 340/870.13 X |
| 3,512,125 | 5/1970 | Raymond | 367/134 |
| 3,996,553 | 12/1976 | Siems et al. | 367/79 |
| 4,023,140 | 5/1977 | Siems et al. | 367/79 |
| 4,398,271 | 8/1983 | Cretin et al. | 367/79 X |

Primary Examiner—Nelson Moskowitz
Assistant Examiner—Brian Steinberger
Attorney, Agent, or Firm—Robert A. Kulason; Ronald G. Gillespie

[57] ABSTRACT

Apparatus for multiplexing ancillary devices in a streamer cable towed by a boat in ocean seismic operation, in which the cable includes a plurality of ancillary devices located throughout the cable. The apparatus includes a source providing step pulses located on the boat. Also located on the boat is a circuit providing control signals and a network providing control voltages. A plurality of series connected control pulse circuits are located in the streamer cable with the first control pulse circuit of the series being connected to the step pulse source. The control pulse circuits are responsive to the step pulses for providing a plurality of control pulses in a predetermined sequence. An energizing voltage source located on the boat provides a square wave energizing voltage. A plurality of switching networks are located throughout the cable with each switching network being connected to a corresponding ancillary device. Each switching network is also connected to a corresponding control pulse circuit and to either the control voltage source or to the energizing voltage source depending on the nature of the corresponding ancillary device. Display apparatus is connected to the plurality of switching networks and displays information from those ancillary devices that provide data signals as the data signals are provided by the plurality of switching networks.

9 Claims, 4 Drawing Figures

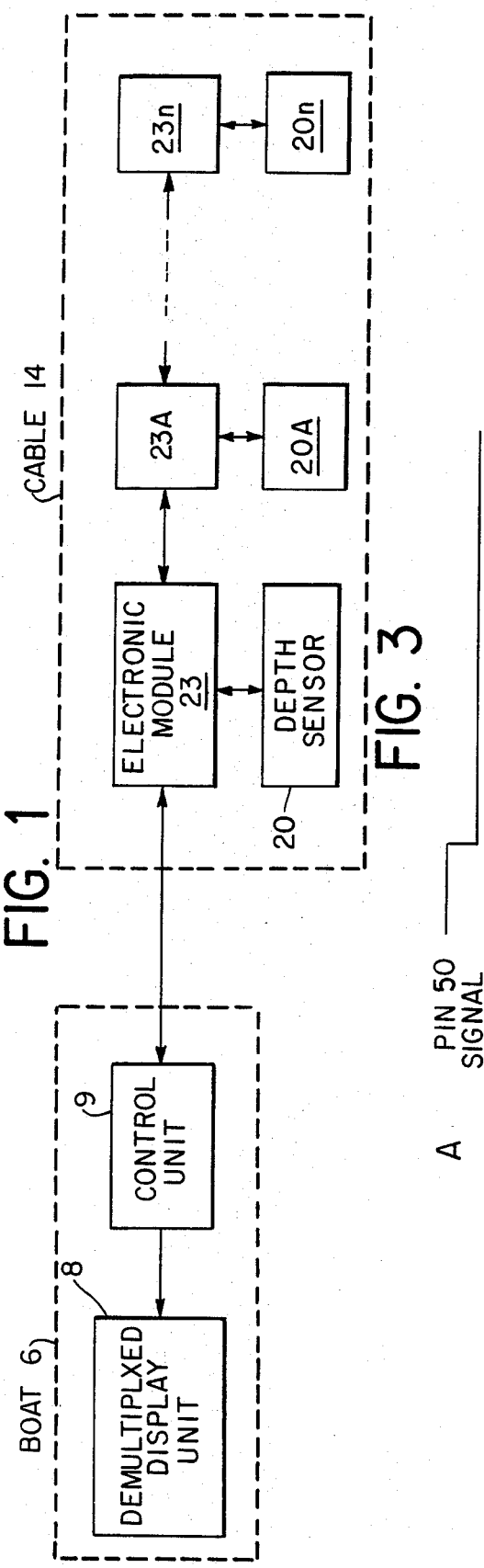
FIG. 1
FIG. 3
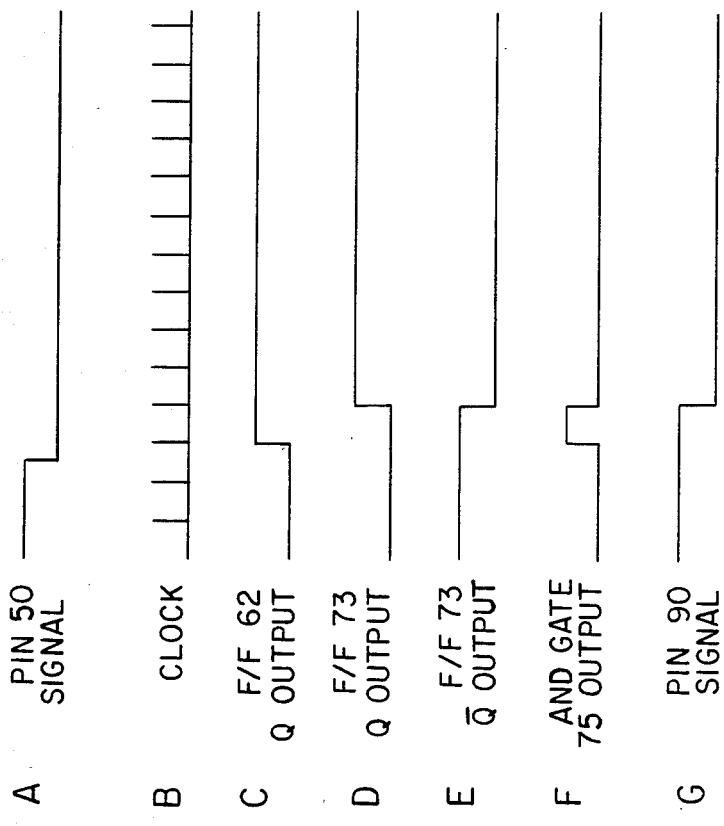

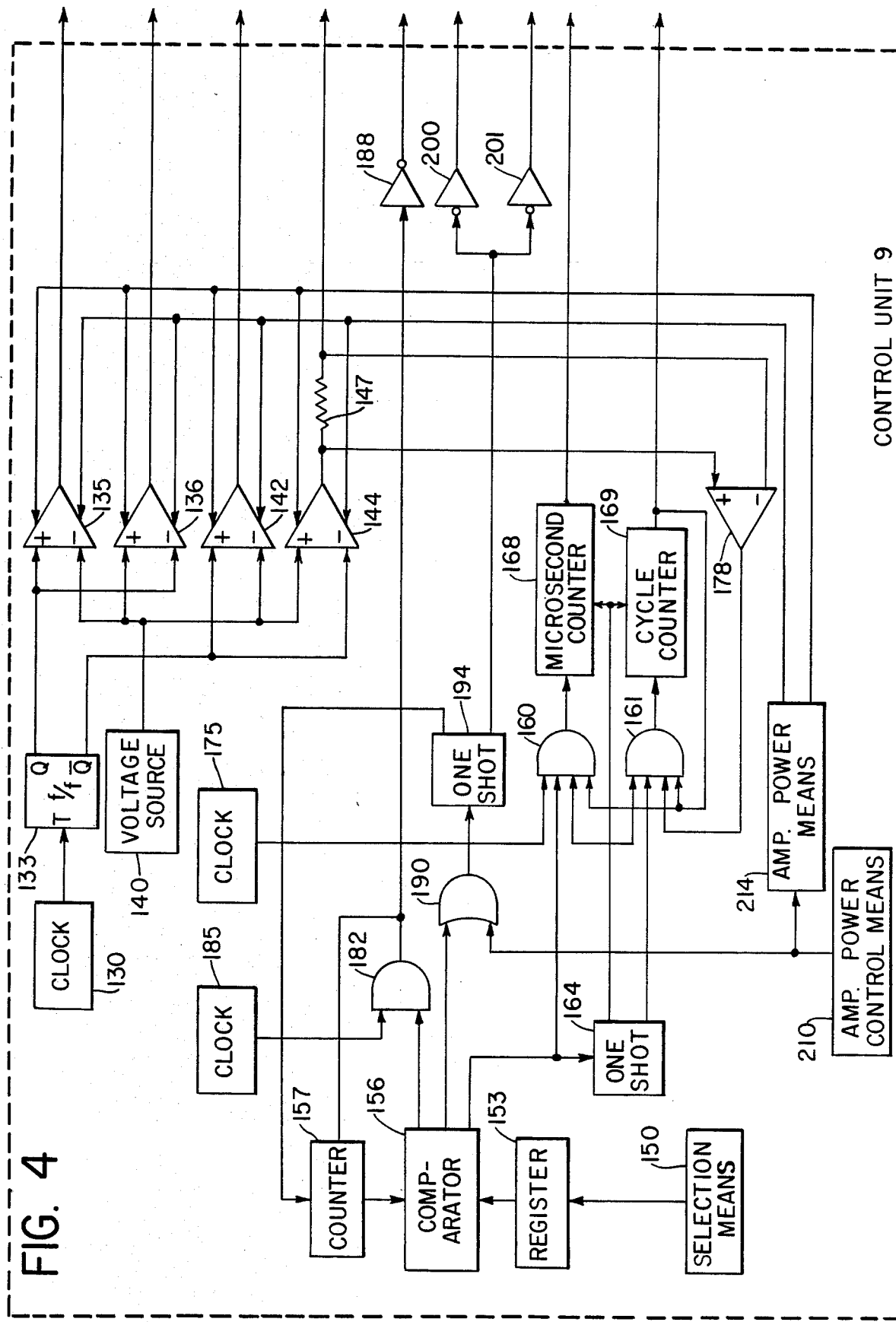

STREAMER CABLE MULTIPLEXING APPARATUS

BACKGROUND OF THE INVENTION

Field of the Invention

The present invention relates to seismic equipment and, more particularly, to a multiplexing system for use with streamer cables.

SUMMARY OF THE INVENTION

Apparatus for multiplexing ancillary devices in a streamer cable towed by a boat in ocean seismic operation, in which the cable includes a plurality of ancillary devices located throughout the cable. The portion of the apparatus on the boat includes a source of step pulses, a circuit providing control signals, a network providing control voltages, and an energizing voltage source providing a square wave energizing voltage. The portion of the apparatus in the streamer cable includes a plurality of control pulse circuits connected in series with the first control pulse circuit being connected to the step pulse source. The control pulse circuits are responsive to the step pulses for providing a plurality of control pulses in a predetermined sequence. A plurality of switching networks are located throughout the cable with each switching network being connected to a corresponding ancillary device. Each switching network is also connected to a corresponding control pulse circuit and to either the control voltage source or to the energizing voltage source depending on the nature of the corresponding ancillary device. Each switching circuit places the corresponding ancillary device on-line during the presence of a control pulse from the control pulse circuit or keeps the corresponding ancillary device off-line during the absence of a control pulse from the control pulse circuit. Display equipment located on the boat is connected to the plurality of switching networks and displays information from those ancillary devices that provide data signals as the data signals are provided by the plurality of switching networks.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and not to be construed as defining the limits of the invention.

DESCRIPTION OF THE DRAWINGS

FIG. 1 is a simplified block diagram of a streamer cable multiplexing apparatus constructed in accordance with the present invention.

FIG. 3 is a graphic representation of voltages occurring in the electronic module shown in FIG. 2, during normal operation.

FIG. 4 is a detailed block diagram of the control unit shown in FIG. 1.

DESCRIPTION OF THE INVENTION

Figure 2:
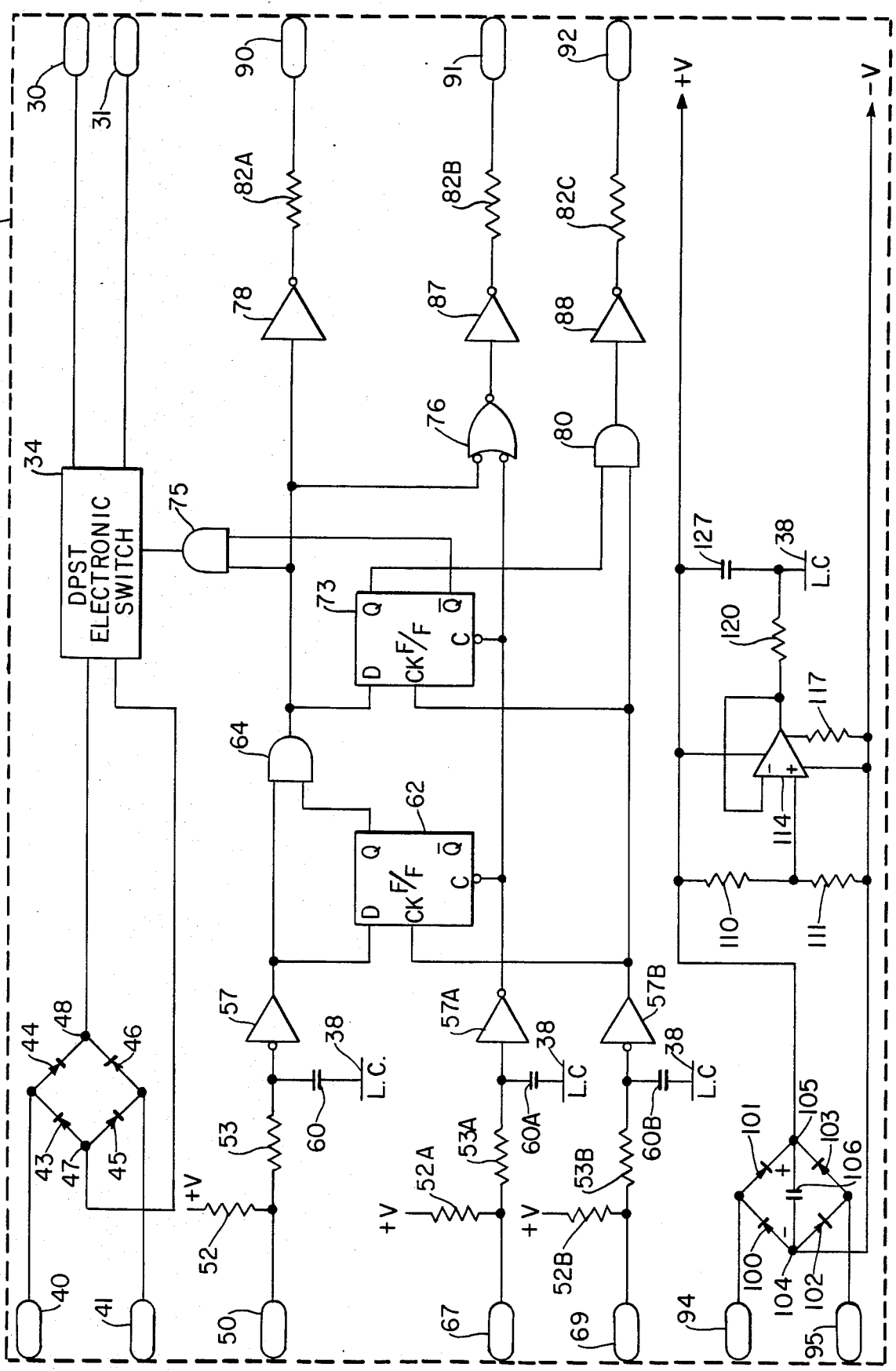
FIG. 2 is a detailed diagram of the electronic module shown in FIG. 1.

In marine seismic exploration, seismic detectors are built into a "streamer cable" towed behind a ship. These streamer cables are typically 1,200 meters to 4,800 meters long. They are towed at a uniform depth of about 15 meters. The cables are oil filled to be slightly buoyant. Devices, other than the seismic detectors, that are needed in the overall operation are hereinafter referred to as ancillary devices. A sampling of such ancillary devices are depth control devices, depth sensing devices and magnetic compasses. Depth control devices, hereinafter referred to as birds, are attached to the cable to pull it down to the desired depth and maintain it there. Depth sensors inside the cable detect the depth at various points along the cable and transmit data to the ship usually over a pair of wires for each depth sensor. Compasses sense the horizontal orientation of the cable and provide representative signals.

The streamer cables are usually manufactured in 50 or 100 meter sections. It is preferable that all sections be identical and interchangeable. Patch plugs are commonly used to connect the ancillary devices into an active mode. Usually, there are more devices in a cable than can be connected due to the limited number of wires that can be built into the cable.

The present invention allows the use of all depth sensors, birds and compasses in the cable with relatively few wires. The present invention also allows the system to be operated through long wires which have appreciable resistance, and has low power consumption. The electronics in the cable, by utilization of the present invention, are kept simple, physically small, and improve upon reliability. The logical address of a specific depth sensor is derived only from its position in the cable. Further simplifying the interchange and addition of new sections. Further, it is possible to determine the location of any faulty module or broken wires from the ship's end of the cable.

Referring now to FIG. 1, a block 6 representing a boat contains a conventional demultiplexed display unit 8, and a control unit 9. Control unit 9 is connected to a streamer cable 14. The details of demultiplexed display unit 8 is not necessary to an understanding of the present invention. Control unit 9, will be described in detail hereinafter. It should also be noted that in cable 14, the seismic detectors are not shown, but only that portion relating to the present invention namely the depth sensors and their associated electronics.

Cable 14 includes a cable element 20. Element 20 may be a depth sensor sensing the depth and providing a corresponding signal, or a bird responsive to received control signals, or a magnetic compass sensing the direction of the cable and providing a corresponding signal. Similarly, element 20A provides a signal to or receives a signal from an electronic module 23A. All elements having the same numeric number with an 'alpha' suffix operate in a similar manner as an element with the same numeric identification without a suffix with the exception that depth sensors and compasses provide signals while birds are responsive to control signals. Each electronic module of electronic modules 23 through 23n has communication with the adjacent electronic modules, electronic module 23 having two-way communication with control unit 9 as hereinafter explained. Control unit 9 then provides a demultiplexed signal representative of the data received from or provided to elements 20, 20A and 20n to the display unit 8 for display.

By way of example, the following disclosure will assume for simplicity sake that element 20 is a depth sensor. Referring now to FIG. 2, depth sensor 20 is electrically connected to pins 30, 31 of electronic module 23 which in turn are connected to an electronic double-pole, single-throw switch 34. Control unit 9 provides a square wave voltage to pins 40, 41 which in turn provide it to a full wave rectifier bridge comprising diodes 43, 44, 45 and 46 to provide a DC voltage. By using a square wave voltage as an energizing voltage instead of the conventional DC voltage the galvanizing effect of an electric current, which is caused by resistive leakage of sea water on the wiring and connections, is minimized. The square wave voltage has a preferred potential of 24–30 volts peak to peak and a frequency within the range of 2 to 10 hertz. The frequency depends on the sample window chosen and is not critical, but it is preferred that the voltage does not change during a measurement interval. Connections 47, 48 of diodes 43, 45 and diodes 44, 46, respectively, are connected to electronic switch 34 which is controlled as hereinafter explained to provide a DC voltage to depth sensor 20. It should be noted that diodes 43, 44 45 and 46 are used when the ancillary device is a depth sensor. Electronic switch 34 is connected directly to pins 40, 41 when the ancillary device is a bird or a magnetic compass.

A pin 50 is connected to a resistor 52 receiving +V DC voltage and to a resistor 53. Resistor 53 in turn is connected to an inverter 57 and to a capacitor 60 which is connected to logic common 38. Resistor 53 and capacitor 60 in cooperation, function as a noise filter while resistor 52 operates as a pullup resistor so that if pin 50 is open circuited, the connection of resistors 52 and 53 will go to a high logic level and disable the rest of the circuit from operating. The output of inverter 57 is connected to a 'D' input of a flip-flop 62 and to an input of an AND gate 64. A 'Q' output of flip-flop 62 is connected to another input of AND gate 64.

A pin 67 is connected to resistors 52A receiving a +V DC voltage, and 53A with resistor 53A being connected to a capacitor 60A and an inverter 57A. Similarly, a pin 69 is connected to resistor 52B, receiving a +V DC voltage, and 53B with resistor 53B being connected to capacitor 60B and to inverter 57B. Capacitors 60A, 60B are connected to logic common 38. The outputs of inverters 57A and 57B are provided to 'C' and 'CK' inputs of a flip-flop 62. Flip-flop 62 also receives +V voltage.

An output of AND gate 64 is provided to a 'D' input of a flip-flop 73, to an input of an AND gate 75, to an input of an OR gate 76 and to an inverter 78. The outputs of inverters 57A, 57B are connected to the 'C' and 'CK' inputs respectively of flip-flop 73. The outputs of inverters 57A, 57B are also connected to inputs of OR gate 76 and AND gate 80, respectively. A Q output of flip-flop 73 is connected to another input of AND gate 80 while the $\overline{Q}$ output of flip-flop 73 is connected to the other input of AND gate 75. AND gate 75 is connected to electronic switch 34.

OR gate 76 and AND gate 80 outputs are connected to inverters 87 and 88, respectively. The outputs of inverters 78, 87 and 88 are connected to resistors 82A, 82B and 82C, respectively, which in turn are connected to pins 90, 91 and 92, respectively. Pins 90, 91 and 92 are externally connected to pins 50A, 67A and 69A of electronic module 23A.

Control unit 9 also provides a square wave voltage to pins 94, 95 which are connected to a fullwave rectifier bridge comprising diodes 100, 101, 102 and 103 and a capacitor 106 connected between a connection 104 of diodes 100 and 102 and a connection 105 of diodes 101 and 103. The DC voltage provided is divided into the +V voltage and the −V voltage by the operation of resistors 110, 111 which are connected in parallel across capacitor 106 with the connection between resistors 110, 111 being connected to a '+' input of an operational amplifier 114 whose output is connected back to a '−' input. Operational amplifier 114 receives the −V and +V voltages dirercrtly and the −V voltage through a resistor 117. The output of amplifier 114 is connected through a resistor 120 to logic common 38. A capacitor 127 is also connected between connection 105 and logic common 38. The output of amplifier 114 is a regenerated logic common that each electronic module 23 or 23A has the logic common regenerated. Resistor 120 and capacitor 127 provide a low pass filter.

The purpose of logic common regeneration is to provide for exactly balanced currents in pins 94 and 95 and hence conductors from the boat thereby further reducing the risk of electrolysis in streamer cable 14.

In regards to the operation of the remainder of electronic module 23 an enabling signal, as shown in FIG. 3A, is provided by control unit 9. The enabling signal is inverted by inverter 57 which enables the 'D' input of flip-flop 62. Meanwhile, clock pulses, shown in FIG. 3B, are provided to pins 69 by control unit 9 which in turn provides them to inverter 57B. The inverted clock pulses are provided to the 'CK' input of flip-flop 62. When the signal at pin 50 changes from a high logic level to a low logic level, the enable signal applied to input 'D' of flip-flop 62 has changed from a low logic level to a high logic level, thereby enabling flip-flop 62 so that the next subsequent clock pulse provided by inverter 57B triggers flip-flop 62 to a 'set' state. A flip-flop while in a set state provides a high logic level signal at its Q output and a low logic level signal at its $\overline{Q}$ output. A flip-flop also provides a low logic level signal at its Q output and a high logic level signal at its $\overline{Q}$ output when in a 'clear' state.

As can be seen in FIG. 3C, the signal at the Q output of flip-flop 62 changes from a low logic level to a high logic level in response to the triggering of flip-flop 62 which fully enables AND gate 64 along with the output from inverter 57. AND gate 64, when enabled, provides a high logic level signal to the 'D' input of flip-flop 73 so that the next subsequent clock pulse provided by inverter 57B triggers flip-flop 73 to the set state. Prior to flip-flop 73 being triggered to the set state, the $\overline{Q}$ output of flip-flop 73 provided a high logic level signal to AND gate 75 so that the enabling signal from AND gate 64 completely enables AND gate 75, whose output is shown in FIG., 3F. When flip-flop 73 is triggered to the set state, the signals provided by the $\overline{Q}$ output of flip-flop 73 goes to a low logic level, thereby disabling AND gate 75. It should be noted that the output of AND gate 75 provides a pulse of sufficient duration to energize electronic switch 34 to pass a DC voltage to pins 30 and 31 and hence to depth sensor 20. While energized, depth sensor 20 provides a frequency modulated signal across pins 30 and 31 whose frequency is representative of the sensed depth of cable 14 at that location which is then provided back through the rectifier bridge composed of diodes 43, 44, 45 and 46 and hence back to the control unit 9. The information is then converted from frequency to depth and displayed by the display unit 8.

With regards to FIG. 4, control unit 9 includes a clock 130 providing clock pulses to a trigger input of a flip-flop 133 having a Q output and a $\overline{Q}$ output. A flip-flop in a 'set' state provides a high logic level signal at its Q output and a low logic level signal at its $\bar{Q}$ output; when in a 'clear' state, the flip-flop provides a low logic level signal at its Q output and a high logic level signal at its $\bar{Q}$ output. Flip-flop 133 keeps changing state from a 'set' state to the 'clear' state and back again in response to the clock pulses from clock 130.

The Q output of flip-flop 133 is connected to '+' input of an amplifier 135 and to a '−' input of an amplifier 136. A voltage source 140 provides a positive DC voltage, preferably ½ of the high and low output of the flip-flop, to a '−' input of amplifier 135 and a '+' input of amplifier 136. The outputs of amplifiers 135 and 136 are connected by wires in cable 14 to pins 94 and 95 of each electronic module 23, 23A and 23n and together they provide a ±15 volt square wave voltage which is rectified as +V and −V as hereinbefore explained in the electronics modules. Amplifier means 210 provides power to amplifiers 135 and 136.

The $\bar{Q}$ output of flip-flop 133 is connected to a '+' input of an amplifier 142 and to a '−' input of an amplifier 144. Voltage source 140 provides the DC voltage to a '−' input of amplifier 142 and to a '+' input of amplifier 144. Amplifier 144 has a resistor 147, which is used for current sensing as hereinafter explained, connected to its output. The outputs of amplifier 142 and the other end of resistor 147 are connected by wires in cable 14 to pins 40, 41 of each electronics module of electronics modules 23, 23A and 23n. Amplifiers 142, 144 provide ±15 square wave voltage which is rectified in the electronics modules 23 through 23n as hereinbefore explained. Amplifier power means 210 provides power to amplifiers 142 and 144.

Selection means 150 represents two devices, one a microprocessor which keeps track of the sequence of the sensors being monitored and a manual select switch. In either mode of operation, a count corresponding to a desired ancillary device to be brought on-line is entered into a register 153. When the microprocessor is in operation, it continuously changes the count in register 153 as the different ancillary devices are brought on-line. The reason for that is that as hereinafter explained, when the power is turned off for seismic testing, rather than bring ancillary devices back on-line that have already been on-line during the cycle of operation, the present invention will start with the next ancillary device due to be brought on-line.

Register 153 provides signals corresponding to its content to a comparator 156 which is also receiving signals from a counter 157 corresponding to the count in counter 157. The count in counter 157 is representative of the present on-line ancillary device. When the counts in counter 157 and register 153 are the same, comparator 156 provides a first comparison signal, at a high logic level, to AND gate 160 and 161, partially enabling those AND gates, and to a one shot multivibrator 164. One shot 164 provides a reset pulse to counters 168, 169 and an inhibiting pulse to AND gates 160 and 161. AND gates 160 and 161 are disabled for duration of the reset pulse, approximately 20 milliseconds. Counter 169 provides a "count complete" signal to AND gates 160, 161 at a high logic level when the count has not been completed, and at a low logic level when the count has been completed. The low logic level "count complete" signal prevents further counting by counters 168 and 169. The low logic level "count complete" signal also provides display unit 8 with that information, thus indicating that the count in the microsecond counter 168 is ready. A clock 175 provides counting pulses a 1 MHz rate to AND gate 160. Thus when the on-line ancillary device and the desired ancillary device are one and the same, and the previous count in the cycle counter has been completed, one shot mutivibrator 164 provides a reset pulse, resetting counters 168 and 169 and the inhibiting pulse to AND gates 160, 161. The "count complete" signal from counter 169 goes to a high logic level. Upon the termination of the inhibiting pulse, AND gate 160 is fully enabled and passes the counting pulses from clock 175 to microsecond counter 168 which starts to count them.

While this counting process is going on, a modulated signal level converter 178, connected across resistor 147, detects the variation in current resulting from the signal, provided by the depth sensor 120 being interrogated, fed back on the cable and provides pulses. The frequency of pulses corresponds to the detected signal level. The pulses from converter 178 is provided to AND gate 161 and is passed into cycle counter 169. After a predetermined number of pulses have been counted, counter 169 provides the "count complete" signal at a low logic level to AND gates 160, 161, thereby stopping further counting. The counter in cycle counter 168 corresponds to a time period for the predetermined number of pulses to enter counter 169 and hence the frequency of the signal from converter 178. As noted previously the frequency corresponds to the detected signal level and thus to the depth. The output of microsecond counter 168 is provided to the multiplexed display unit 8 for display.

Selection means 150 then causes register 153 to change to the next ancillary device to be brought on-line. This changing is done on a timing basis and not as the result of a completion of a test.

For the situation where the multiplexing operation was in a multiplexing cycle when a seismic activity was initiated, selection means 150 will have a count stored in register 153 which is different than the count stored in counter 157 since upon restart, counter 157 will start with the first ancillary device each restart time. In this situation, comparator 156 provides a second comparison signal at a high logic level, to an AND gate 182 receiving a 20 millisecond square wave signal from a clock 185, AND gate 182 passes the signal from clock 185 when the second signal from comparator 156 is at a high logic level and blocks the square wave signal when comparator 156 signal is at a low logic level. An inverter 188 inverts the passes square wave signal from AND gate 182 and provides it through the cable to pin 69 of electronics module 23 causing it to bring its ancillary device on-line. AND gate 182 is connected to counter 157 which counts the passed square wave signal. When the difference between the count in register 153 and counter 157 is greater than 1, counter 157 continues to count up until the count in counter 157 agrees with the count in register 153. Meanwhile, the inverted passed square will in effect step the ancillary devices until the count in counter 157 agrees with the ancillary device being brought on-line. The agreement between register 153 and counter 157 causes comparator 156 to provide the second comparison signal to AND gate 182 at a low logic level thereby stopping further counting by counter 157. Control unit 9 again operates as previously explained when there is agreement between register 153 and counter 157.

An ancillary device may be selected to be brought on-line that results in the count in register 153 being less than the count in counter 157. In other words, the desired ancillary device has been already passed in the multiplexing operation and it is preferred to return to that unit. One alternative would be to wait until counter 157 reaches an equal count in the next cycle. However, a quicker way is followed by comparator 156 in providing a high logic level third comparison signal when the count in counter 157 is greater than the count entered in register 153. The high logic level third signal passes through an OR gate 190 and is provided to a one shot multivibrator 194 which provides a reset pulse resetting counter 157 to zero so that we now have the situation that the count in counter 157 is less than the count in register 153 a condition that has been previously described. One shot 194 provides another pulse to inverters 200, 201. Inverters 200, 201 are connected to pins 50 and 67 in electronics module 23 through the cable. Thus inverter 200 in response to the signal from one shot 194 provides the enable signal while inverter 201 provides the reset pulse which resets flip-flops 62, 73 in all electronic modules 23, 23A and 23n.

It should be noted again that this present invention deals with the sensing of ancillary information, such as depth and direction, and providing control signals to ancillary devices such as the birds and not to seismic data acquisition. Power provided to the ancillary devices is shut off during seismic operations. Cable power control means 210, which is mainly operated by an operator, provides a high logic level signal to cable power means 124 and to OR gate 190. Cable power means 214 provides biasing voltages to amplifiers 135, 136, 142 and 143 in response to the high logic level signal. The high logic level signal from cable power control means 210 passes through OR gate 190 and triggers one shot 194 to again reset counter 157 so that when the seismic detection is over with counter 157 will be starting at zero as previously explained. When the signal from cable power control means 210 is at a low logic level, the biasing voltages *are not* provided to amplifiers 135, 136, 142, and 144.

A control signal source (not shown) which is presently used in industry is located on the boat which provides control signals to control the birds. The control signals are provided to pins 40, 41 of the electronic modules associated with the birds. A display of the desired depth for the bird may or may not be displayed as desired.

The present invention as hereinbefore described multiplexes signals from and to ancillary devices in a seismic streamer cable in a manner to minimize the corrosive effect of sea water by providing alternating voltages to electronic modules. The alternating voltages reduce the galvanizing effect of an electric current in sea water on wiring and connections. The operation is further enhanced by reconstituting a logic common in each electronic module.

This system requires only 7 wires running the length of the cable for operation of any number of transducers. The number of wires can be reduced to 5 wires by providing power lines 94, 95 to the logic from lines 40 and 41 which also carry the data. This is appropriate only in certain types of systems where power is provided to the sensor over the signal lines.

What is claimed is:

1. Apparatus for multiplexing ancillary devices in a streamer cable towed by a boat in ocean seismic operation, wherein a plurality of ancillary devices are located throughout the streamer cable, comprising step pulse means located on the boat for providing step pulses, means located on the boat for providing control signals, control voltage means located on the boat for providing control voltages, a plurality of control pulse means located in the streamer cable and connected in series with the first control pulse means being connected to the step pulse means and said plurality of control pulse means being responsive to the step pulses for providing a plurality of control pulses in a predetermined sequence, energizing voltage means located on the boat for providing a square wave energizing voltage, a plurality of switch means, each switch means being connected to a corresponding ancillary device, to a corresponding control pulse means and to either the control voltage means or to the energizing voltage means depending on the nature of the corresponding ancillary device for keeping the corresponding ancillary device on-line during the presence of a control pulse from the control pulse means or keeping the corresponding ancillary device off-line during the absence of a control pulse from the control pulse means, and display means connected to the plurality of switch means for displaying information from those ancillary devices that provide data signals as the data signals are provided by the plurality of switch means, further comprising a module voltage means, located on the boat and connected to each control pulse means, for providing a second square wave voltage; and each control pulse means provides its own biasing voltages and logic common utilizing the second square wave voltage.

2. Apparatus as described in claim 1 further comprising means located in the boat and connected to the first control signal means for providing an enabling signal to the first control pulse means; and in which each control pulse means includes means for receiving an enabling signal and for providing an enabling signal to the next subsequent connected control signal means.

3. Apparatus as described in claim 2 further comprising means located on the boat and connected to the first control pulse means for providing reset pulses to the first control pulse means; and, in which the first control pulse means includes flip-flop means responsive to the enabling signal and clock pulses so as to change to a 'set' state when a clock pulse is received by the first flip-flop means and the enabling signal is at one logic level and so as not to change to a 'set' state when the enabling signal is at another logic level and for providing a Q signal at high logic level while in the 'set' state and at a low logic level while in a 'clear state', a two-input first AND gate responsive to the enabling signal and to the Q signal from the first flip-flop means so as to provide an output signal at high logic level when both inputs receive high logic level signals and at a low logic when at least one of the inputs receives a low logic level, second flip-flop means connected to the first AND gate and responsive to the high logic level output signal from the first AND gate and a clock pulse to change to a 'set' state and to a low logic level output signal from the first AND gate and a clock pulse to change to a 'clear' state for providing a high logic level Q output signal and a low logic level $\overline{Q}$ output signal while in the 'set' state and for providing a low logic level Q output signal and a high logic level $\overline{Q}$ output signal while in a 'clear' state, and, a two-input second AND gate connected to the first AND gate to the second flip-flop means and to the corresponding switch means for providing a control pulse to the switch means whose duration is controlled by the triggering of the first and second flip-flop means in accordance with the output signal from the first AND gate and the $\overline{Q}$ signal from the second flip-flop means, 4. Apparatus as described in claim 3 in which each of the control pulse means is identical in construction.

5. Apparatus as described in claim 4 in which each control pulse means includes signal means connected to the first AND gate, to the second flip-flop means, and responsive to the enabling signal, the clock pulses and the reset pulses for providing an enabling signal, clock pulses and reset pulses to next subsequent control signal means in accordance with the output signal from the first AND gate and the Q output signal from the second flip-flop means.

6. Apparatus as described in claim 5 in which the energizing voltage means includes a clock means for providing timing pulses at a first predetermined frequency, a flip-flop connected to the clock means and responsive to the timing pulses to alternately keep changing state and providing a Q and $\overline{Q}$ signals in accordance with its state, a voltage source providing a DC voltage, a pair of operational amplifiers having '+' and '−' inputs in which the '+' and '−' inputs of one amplifier receives the $\overline{Q}$ signal from the flip-flop and the DC voltage from the voltage source, respectively, while the '+' and '−' inputs of the other amplifier receives the DC voltage from the voltage source and the $\overline{Q}$ signal from the first amplifier, respectively, and the amplifiers provide the square wave energizing voltage.

7. Apparatus as described in claim 6 in which the module voltage means includes a pair of amplifiers having '+' and '−' inputs and the '+' and '−' inputs of one amplifier receives the Q signal from the flip-flop in the energizing voltage means and the DC voltage from the voltage source in the energizing voltage means, respectively, while the other amplifier receives the DC voltage from the voltage source in the energizing voltage means and the Q signal from the flip-flop in the energizing voltage means at its '+' and '−' inputs, respectively, and the amplifiers in the module voltage means provides the second square wave voltage.

8. Apparatus as described in claim 7 in which the step pulse means includes selection means for selecting an ancillary device to be brought on-line and providing a corresponding signal, present device means for providing a signal corresponding to the ancillary device presently on-line, comparing means for comparing the signal from the selection means with the signal from the present device means and providing the comparison signals, representative of the comparison, means providing clock pulses at a predetermined frequency, an AND gate connected to the comparing means and to the clock means of the step pulse means for passing or blocking the timing pulses from the clock means step pulse in accordance with a comparison signal so that the passed timing pulses are provided as step pulses.

9. Apparatus as described in claim 8 in which the display means includes a cycle counter, a microsecond counter, a resistor connecting one of the amplifiers in the energizing voltage means to each of the control pulse means so that when an ancillary device provides a signal corresponding to a sensed parameter, the current through the resistor changes accordingly, a converter amplifier connected across the resistor senses the current through the resistor and provides corresponding pulses which are counted by the cycle counter.

* * * * *